No. 859,381. PATENTED JULY 9, 1907.
F. P. HAMMAN.
FISHING REEL.
APPLICATION FILED MAR. 27, 1907.
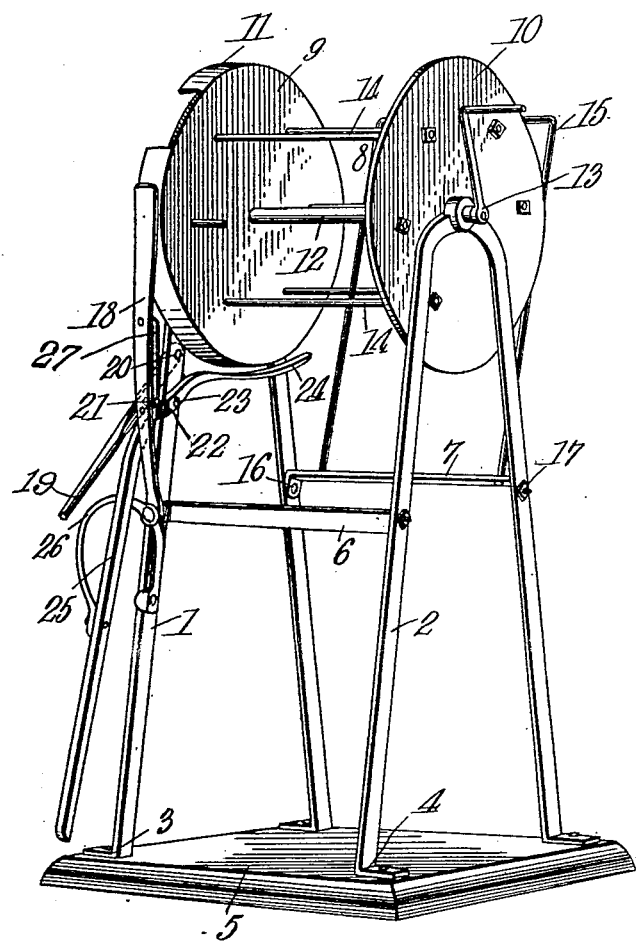
Frank P. Hamman,
INVENTOR.
WITNESSES:
By C. A. Snow & Co.
ATTORNEYS

UNITED STATES PATENT OFFICE.

FRANK P. HAMMAN, OF ORLEANS, MICHIGAN.

FISHING-REEL.

No. 859,381.  Specification of Letters Patent.  Patented July 9, 1907.

Application filed March 27, 1907. Serial No. 364,883.

*To all whom it may concern:*

Be it known that I, FRANK P. HAMMAN, a citizen of the United States, residing at Orleans, in the county of Ionia and State of Michigan, have invented a new and useful Fishing-Reel, of which the following is a specification.

The present invention relates to improvements in fishing apparatus, and more especially to that class adapted for use in deep-sea fishing, and it has for its object to provide an improved reel for the line having a tension device for producing the desired tension on the line and prevent undue unwinding of the reel, the tension device being provided with a device for setting into operative and inoperative positions, and it also provides a simple and improved brake for controlling the paying out of the line.

To these and other ends the invention consists in certain improvements and combinations and arrangements of parts, all as will be hereinafter more fully described and set forth with particularity in the claims at the end of the specification.

The accompanying drawing is a perspective view of a fishing reel constructed in accordance with my present invention.

The present embodiment of the invention comprises a frame or other suitable support, embodying, in the present instance, a pair of yoke-shaped members 1 and 2 having their ends out-turned as at 3 and 4 and secured by screws or other suitable devices to a suitable support, a base plate 5 being employed in the present instance to support the frame and adapted to be secured to the top of one of the seats in a boat, spacing rods 6 and 7 serving to connect the members of the frame. In the upper portions of the side members of the frame is mounted a reel 8 of a size sufficient to retain the relatively heavy lines such as are employed in deepsea fishing. This reel comprises a pair of flanges 9 and 10, the flange 9 being provided with a laterally turned concentric rim 11 adapted to serve as a brake surface. These flanges are mounted to revolve with the shaft 12, the latter being provided on the outer side of the frame with an operating crank 13, and the flanges are held in proper relation by a circular row of bars 14, these bars also serving to receive a coil of rope or twine.

On one of the spacing bars, preferably the bar 7, is mounted a line guard for holding the line clear of the boat or other support on which the reel is mounted, and serving to insure the proper laying of the convolutions of the line during its winding. This guard embodies, in the present instance, a frame 15 composed of a bar of iron having a horizontal intermediate portion arranged in coöperative relation with the reel and provided with a pair of downwardly extending arms riveted or otherwise secured in apertures in the bar 7. The latter is preferably secured to the side members of the frame by means of bolts 16 and 17 as this permits a relative swinging movement of the guard in a vertical plane about these bolts as pivotal centers, and therefore the line-engaging portion of this guard may be adjusted at different distances from the axis of the reel.

It is preferable to employ a suitable device for preventing unwinding movement of the reel except under a given tension on the line, and this device embodies in the present instance a resilient member 18 having one end thereof rigidly attached to a suitable part of the frame and having its upper free end coöperating with the rim 11 on the reel as a friction brake, the friction thus produced tending to retard unwinding movement of the reel, and in order to relieve the resistance or retarding action during the winding of the line, a lever 19 is provided which is pivoted to the relatively fixed portion of the frame, as at 20, and has a projection 21 engaging in rear of the tension member, lifting movement of the lever about its pivot serving to carry the projection thereon in a circular path that will cause it to engage behind and retract the tension member and thus permit the reel to operate freely. The pivot of the retracting device is preferably so arranged that when the lever is lifted to a position substantially perpendicular to the tension device, it will automatically lock and thus retain the tension device in retracted position during the winding of the line. A guard 27 is preferably arranged on the rear side of the resilient arm 18 and adapted to coöperate with the projection 21 on the operating lever and serving to retain the latter in coöperative relation with the tension device.

The brake employed in the present instance for controlling the paying out of the line embodies a bar having an intermediate portion 22 pivoted to the relatively fixed portion of the frame, as at 23, and having a brake shoe 24 thereon adapted to move into and out of coöperative relation with the rim on the reel, the opposite end of the bar projecting downwardly and forming an operating lever 25 adapted to be operated by the foot or the hand, as may be desired. A bow spring 26 having its ends attached respectively to the lever 25 and the frame normally operates to retract the brake.

A fishing apparatus constructed in accordance with my present invention is so simple in its construction that it may be manufactured at small cost, and the tension device serves to so retard the movement of the reel that tangling of the line is prevented, the brake enabling the line to be easily controlled by the operator.

What is claimed is:—

1. In fishing apparatus, the combination with a frame, and a reel supported thereby and adapted to contain the line, of a tension device normally operating to retard the operation of the reel embodying a resilient arm having one end rigidly attached to the frame and its free end engaging the reel, and a retracting lever pivoted to a relatively fixed part of the frame having a portion adapted to coöperate with the tension device to retract it, and means for retaining the said lever and tension device in coöperative relation.

2. In fishing apparatus, the combination with a frame, and a reel supported thereby and adapted to contain the line, of a tension device for the reel embodying a resilient member rigidly attached to one end to the frame and having a free end arranged to coöperate with a portion of the reel, and a retracting lever pivotally attached to the frame and having a laterally extending projection arranged to coöperate with the resilient member to retract the latter as the lever is operated, and means coöperating with the said projection for retaining said lever and tension device in coöperative relation.

3. The combination with a frame, and a reel mounted therein embodying a pair of flanges and a shaft supporting them, one of said flanges being provided with a laterally turned rim to form a brake surface, of a yielding tension device embodying a spring arm having one end fixed to the frame and its free end coöperating with said rim to control the operation of the reel, and a device operatively connected to the said arm for moving it into and out of engagement relatively to the said rim.

4. In fishing apparatus, the combination with a suitable frame, and a reel mounted therein, of a line guard pivotally mounted on the frame and having a line engaging portion movable toward and from the reel and devices for securing the guard in different positions of adjustment relatively to the reel.

5. In fishing apparatus, the combination with a frame embodying side members, and a reel mounted thereon, of a spacing bar capable of turning between the side members of the frame, bolts serving to pivot and secure the said bar relatively to the frame, and a line guard carried by said bar and having a line engaging portion adjustable relatively to the reel.

6. In fishing apparatus, the combination with a frame, and a reel mounted therein and adapted to contain the line, of a tension device embodying a resilient arm having one end fixed to the frame and its free end coöperating with the reel for controlling the movements of the line, and a lever pivoted to operate in the plane of movement of the tension device for setting the tension device in operative and inoperative positions and a guard carried by the said arm and coöperating with the said lever for retaining the latter in coöperative relation with the tension device.

In testimony that I claim the foregoing as my own, I have hereto affixed my signature in the presence of two witnesses.

FRANK P. HAMMAN.

Two witnesses:
MORTON OLMSTED,
A. H. JACKSON.